(12) United States Patent
Pautis et al.

(10) Patent No.: US 11,319,080 B2
(45) Date of Patent: May 3, 2022

(54) ASSEMBLY FOR AN AIRCRAFT COMPRISING A PRIMARY STRUCTURE FOR AN ATTACHMENT PYLON SECURED TO A WING BOX BY MEANS OF FITTINGS THAT ARE MORE COMPACT IN THE LEADING EDGE REGION

(71) Applicant: Airbus Operations SAS, Toulouse (FR)

(72) Inventors: Olivier Pautis, Merville (FR); Jérôme Colmagro, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 703 days.

(21) Appl. No.: 16/230,200

(22) Filed: Dec. 21, 2018

(65) Prior Publication Data
US 2019/0202573 A1 Jul. 4, 2019

(30) Foreign Application Priority Data
Dec. 29, 2017 (FR) ..................... 1763354

(51) Int. Cl.
*B64D 27/26* (2006.01)
*B64D 27/18* (2006.01)
*F01D 25/28* (2006.01)

(52) U.S. Cl.
CPC ............ *B64D 27/26* (2013.01); *B64D 27/18* (2013.01); *B64D 2027/264* (2013.01); *F01D 25/28* (2013.01); *F05D 2240/90* (2013.01)

(58) Field of Classification Search
CPC .. B64D 2027/264; B64D 27/26; B64D 27/18; B64D 2027/262; B64D 2027/266
See application file for complete search history.

(56) References Cited

U.S. PATENT DOCUMENTS

| 2008/0217467 | A1* | 9/2008 | Lafont | B64D 27/18 244/54 |
| 2008/0217502 | A1 | 9/2008 | Lafont | |
| 2010/0147996 | A1* | 6/2010 | Hartshorn | B64D 27/26 244/54 |
| 2011/0036942 | A1* | 2/2011 | Marche | B64D 27/26 244/54 |

FOREIGN PATENT DOCUMENTS

| FR | 2887522 A1 * | 12/2006 | ............. B64D 27/26 |
| FR | 2887522 A1 | 12/2006 | |

OTHER PUBLICATIONS

French Search Report; priority document.

* cited by examiner

*Primary Examiner* — Richard G Davis
(74) *Attorney, Agent, or Firm* — Greer, Burns & Crain, Ltd.

(57) ABSTRACT

An aircraft comprising a wing, an engine attachment pylon comprising a primary structure and an arrangement for securing the primary structure to a wing box. The arrangement comprises two lateral front fittings, each of these fittings comprising a first connecting portion secured to the front wing spar, a second connecting portion secured to the primary structure of the attachment pylon, at least one securing member linking the first and second connecting portions, this securing member being articulated to the first connecting portion with the aid of a first pin system oriented substantially parallel to the front wing spar.

16 Claims, 3 Drawing Sheets

ASSEMBLY FOR AN AIRCRAFT COMPRISING A PRIMARY STRUCTURE FOR AN ATTACHMENT PYLON SECURED TO A WING BOX BY MEANS OF FITTINGS THAT ARE MORE COMPACT IN THE LEADING EDGE REGION

CROSS-REFERENCES TO RELATED APPLICATIONS

This application claims the benefit of the French patent application No. 1763354 filed on Dec. 29, 2017, the entire disclosures of which are incorporated herein by way of reference.

FIELD OF THE INVENTION

The present invention lies in the field of aircraft, and relates, in particular, to assemblies comprising an aircraft wing and an engine attachment pylon secured under this wing. The invention relates, preferably, to assemblies of this kind that are intended to support large-diameter engines of turbofan type. An example of this type of assembly is disclosed for example in the document FR 2 887 522.

The invention applies, in particular, to commercial aircraft.

BACKGROUND OF THE INVENTION

In existing aircraft, engines, such as jet engines, are suspended below the wing by complex attachment devices, also known as EMS (for Engine Mounting Structure), or by attachment pylons. The attachment pylons usually used have a primary structure, also known as a rigid structure, which is often in the form of a box, that is to say, is produced by assembling lower and upper spars that are connected together by a plurality of transverse reinforcing ribs situated inside the box and at the ends thereof. The spars are arranged on lower and upper faces, while lateral panels close the box at lateral faces. Moreover, the attachment pylon is arranged in the upper part of the engine, between the latter and the wing box. This is referred to as the "12 o'clock" position.

As is known, the primary structure of these pylons is designed to allow the static and dynamic loads brought about by the engines, such as the weight, the thrust, or the different dynamic loads, in particular those associated with incidences of failure such as fan blade out (FBO), collapse of the front landing gear, hard landing, etc., to be transmitted to the wing.

In attachment pylons known from the prior art, such as in the document FR 2 887 522, the transmission of loads between its primary structure and the wing box is conventionally ensured by a set of fittings comprising a front fitting, a rear fitting, and an intermediate fitting, the latter being intended, in particular, to react thrust loads generated by the engine. These fittings are conventionally interposed vertically between the wing box and the primary structure of the attachment pylon.

Recent engines have increasingly large diameters. For turbofan engines such as jet engines, the high bypass ratio that is desired has resulted in particularly high bulk, since an increase in the bypass ratio inevitably causes an increase in the diameter of the engine and more particularly an increase in the diameter of its fan casing.

Consequently, with a ground clearance that is determined so as to remain acceptable from a safety point of view, the space remaining between the wing and the engine proves to be increasingly limited. As a result, it has become difficult to install the attachment pylon and the various wing fittings in this remaining vertical space usually dedicated to this installation. It is all the more difficult given that the loads that pass through are also high and require appropriate dimensioning for the wing box, the primary structure and the fittings connecting these two elements. Specifically, the latter have to have sufficient dimensions to provide mechanical strength that is capable of withstanding the transmission of loads from the engine to the wing, with small deformation under stress in order not to impair the aerodynamic performance of the propulsion system.

In the prior art, numerous solutions have been proposed for bringing the engine as close as possible to the wing element from which it is suspended, specifically with the aim of maintaining the required ground clearance in spite of the increase in dimensions of the engine. In particular, it is possible to install, at least in part, some fittings in a leading edge region of the wing. However, the high loads to be withstood by these fittings mean that the latter have to be dimensioned accordingly, in particular in the longitudinal direction, thus leaving limited space for the systems and equipment usually accommodated in the leading edge region.

Therefore, there is a need to optimize existing designs in order to reduce the bulk of the fittings connecting the wing box to the pylon box.

SUMMARY OF THE INVENTION

In order to meet this need, the subject of the invention is an assembly for an aircraft comprising:
  an aircraft wing comprising a wing box formed in part with the aid of a front wing spar, of an upper suction-side skin and a lower pressure-side skin;
  an engine attachment pylon arranged under the wing, the pylon comprising a primary structure in the form of a pylon box having an upper spar extending at least in part under the wing box, and
  means for securing the primary structure of the attachment pylon to the wing box.

According to the invention, the securing means comprise two lateral front fittings, each of these fittings comprising:
  a first connecting portion secured to the front wing spar;
  a second connecting portion secured to the primary structure of the attachment pylon;
  at least one securing member linking the first and second connecting portions, the at least one securing member being articulated to the first connecting portion with the aid of a first pin system oriented substantially parallel to the front wing spar.

By virtue of the proposed arrangement, and, in particular, of the specific orientation of the first pin system, the securing member(s) can be moved as close as possible to the front wing spar. As a result, the first connecting portions which are secured to this front spar can be more compact in the longitudinal direction.

Moreover, the reduction in thickness of the first connecting portions makes it possible to reduce the offset of load introduction into the front spar of the wing box. This helps to make it possible to reduce the thickness of this connector even further, since the latter no longer requires specific dimensioning in order to withstand the cantilever effects, as they are known, that are likely to introduce a bending moment into the connector and into the front wing spar.

These sources of bulk reduction advantageously make it possible to provide a large volume in front of the lateral front fittings, for the installation of conventional systems and equipment in the leading edge region of the wing.

The invention preferably provides at least one of the following optional features, taken on their own or in combination.

The at least one securing member is articulated to the second connecting portion with the aid of a second pin system oriented substantially orthogonally to the front wing spar.

Each securing member is arranged substantially parallel to a vertical direction of the assembly.

Each first connecting portion is a connector in the form of a bracket secured both to the front wing spar and to the upper suction-side skin, the connector in the form of a bracket being arranged entirely in a leading edge region of the wing.

The two second connecting portions are made in one piece in an interior transverse reinforcing rib of the pylon box, the two second connecting portions projecting out of this pylon box and penetrating preferably in part into a leading edge region of the wing.

The securing means also comprise a central front fitting configured to react load exerted in a transverse direction of the assembly and in the longitudinal direction, the central front fitting comprising preferably a shear pin.

Each first connecting portion comprises two lateral flanks which bear the first pin system and between which the at least one associated securing member is arranged, the lateral flanks being configured to prevent the at least one securing member from moving in translation in the direction of the first pin system in the event of failure occurring at the central front fitting.

The assembly comprises at least one system and/or piece of equipment arranged in a leading edge region of the wing, in front of the lateral front fittings.

Each of the lateral front fittings is designed to allow load exerted in a vertical direction of the assembly to be reacted.

The securing means also comprise a rear fitting secured to a rear closing rib of the pylon box, and the rear fitting is preferably designed so as to allow load exerted in a vertical direction of the assembly and in a transverse direction of the assembly to be reacted.

The securing means form a statically determinate load-reacting system.

Finally, a further subject of the invention is an aircraft comprising at least one such assembly.

Further advantages and features of the invention will become apparent from the following nonlimiting detailed description.

BRIEF DESCRIPTION OF THE DRAWINGS

This description will be given with reference to the appended drawings, in which:

FIG. 1 shows a side view of an aircraft comprising an assembly according to the invention;

DETAILED DESCRIPTION OF THE PREFERRED EMBODIMENTS

Figure 2:
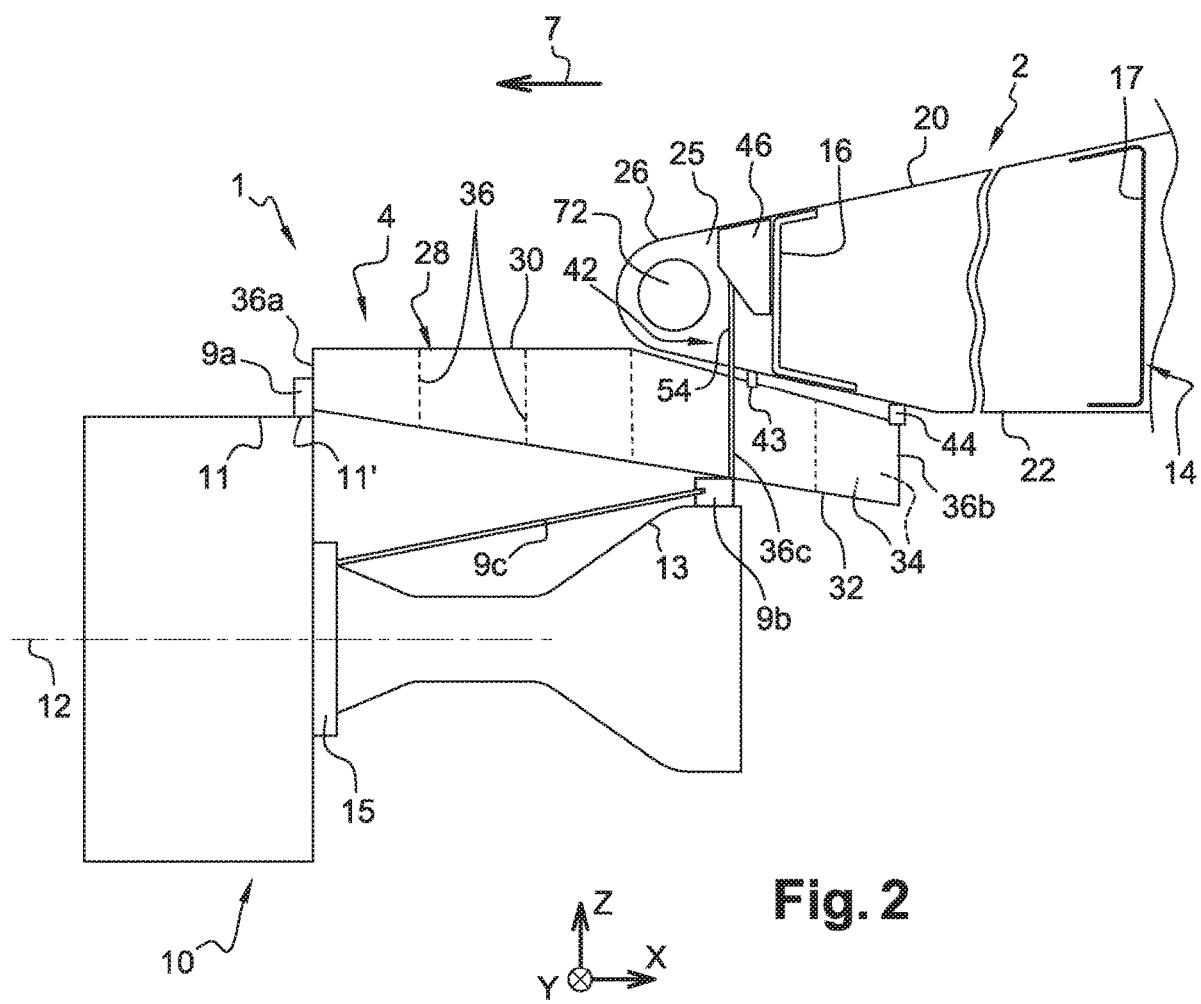
FIG. 2 is an enlarged side view showing the assembly from FIG. 1 bearing an engine.

FIG. 1 shows an aircraft 100 comprising a fuselage 3 to which two wings 2 (only one visible in FIG. 1) are secured, each wing being an integral part of an assembly 1 according to the invention. The assembly 1 carries a twin-spool turbofan engine 10, such as a jet engine with an ultra high bypass ratio (UHBR). The assembly 1 comprises not only the wing 2 but also a pylon 4 for attaching the engine 10 that is interposed between the wing 2 and this engine.

Throughout the following description, by convention, the direction X corresponds to the longitudinal direction of the assembly 1, which is also comparable to the longitudinal direction of the engine 10, this direction X being parallel to a longitudinal axis of this engine. Moreover, the direction Y corresponds to the direction oriented transversely to the assembly 1, likewise comparable to the transverse direction of the engine. Finally, the direction Z corresponds to the vertical or height direction, these three directions X, Y and Z being mutually orthogonal. Therefore, the engine 10 is suspended under the assembly 1, in the direction Z.

Moreover, the terms "front" and "rear" should be considered with respect to a direction of forward movement of the aircraft that is encountered as a result of the thrust exerted by the engines 10, this direction being depicted schematically by the arrow 7.

FIG. 2 now shows the assembly 1 under which the engine 10, of longitudinal axis 12, is suspended. The wing 2 of this assembly 1 has a conventional design in that it has a wing box 14 extending in a wingspan direction of the wing. The wing box 14 is formed by a front spar 16, a rear or intermediate spar 17, an upper suction-side skin 20, and a lower pressure-side skin 22. The two spars 16, 17 are preferably substantially parallel, extending in the wingspan direction and being spaced apart from one another in a direction of the wing chord. Substantially longitudinal interior reinforcing ribs (not shown) can be accommodated inside the wing box 14, being secured to each of the four box elements 16, 17, 20, 22 by rivets, bolts or similar elements. Furthermore, in front of the wing box 14, the wing 2 has a cowling 26 forming the leading edge of the wing and defining with the front spar 16 a leading edge region 25.

The other element of the assembly 1, the attachment pylon 4, comprises a primary structure 28 in the form of a box. The other constituent elements (not shown) of this pylon 4, of the secondary structure type separating and holding the systems while carrying aerodynamic fairings, are conventional elements similar to those encountered in the prior art. Therefore, a detailed description thereof will not be given.

The primary structure 28, or rigid structure, allows the transmission of static and dynamic loads brought about by the engine 10 to the wing box 14. The box formed by this primary structure 28 extends along the entire length of this primary structure, in the direction X. It has a conventional design, in that it is delimited upwardly by an upper spar 30, downwardly by a lower spar 32, and laterally by lateral panels 34. As is visible in FIG. 2, the upper spar 30 is situated at least in part under the wing box 14. In this regard, it is noted that each of the abovementioned elements 30, 32, 34 can be produced in one piece, or by assembling a plurality of separate pieces. In addition, one and the same piece can form all or part of several of these elements 30, 32, 34.

The pylon box 28 is equipped with transverse reinforcing ribs, some of which are arranged substantially in planes YZ and are distributed in the direction X. They are interior transverse ribs 36, a transverse reinforcing rib 36b closing the rear of the pylon box 28, referred to as rear closing rib, and a transverse reinforcing rib 36a closing the front of the box, referred to as front closing rib. The ribs 36, 36a, 36b connect the exterior elements of the box 30, 32, 34 together. Another transverse reinforcing rib 36c specific to the invention is present inside the pylon box. This rib 36c is an integral part of two lateral front fittings 42 and mechanically links these wing fittings 42 to the rear engine fitting which will be described below. The rib 36c may extend in a plane YZ like the other interior ribs 36, but extends preferably in a plane P' substantially parallel to that of the front wing spar 16, and more particularly the plane defined by the front face thereof.

The pylon box 28 has a cross section YZ in the overall shape of a square, rectangle or parallelogram. The cross section changes in the direction X, but nevertheless has a constant shape along the entire length of the pylon box 28, allowing better drainage of the loads within this box. In other words, the cross section does not abruptly change shape along the pylon box 28. Preferably, this cross section narrows gradually from a median portion of the box, running toward the front and toward the rear. The rib 36c for its part is situated in this median portion, or behind the latter.

The engine 10 is secured to the pylon box 28 in a conventional manner, which will now be briefly described. A front engine fitting 9a is provided, connecting the front closing rib 36a to a fan casing 11 of the engine, or to an exterior shell ring 11' of an intermediate casing. Also provided is a rear engine fitting 9b connecting a casing 13 via which the engine gases are ejected to a bottom part of the pylon box 28. Preferably, the body of the rear engine fitting 9b is secured to the lower spar 32 and close to a bottom end of the interior transverse reinforcing rib 36c, so as to promote a more direct load path between the engine and the wing. In addition, the two engine fittings 9a, 9b are complemented by two conventional links 9c for reacting thrust loads, which connect a base 15 of the intermediate casing to the body of the rear engine fitting 9b.

These engine fittings 9a, 9b, 9c are produced in a conventional manner known to a person skilled in the art. They jointly form a statically determinate or almost statically determinate load-reacting system, just like the means for securing the pylon box 28 to the wing box 14, which are specific to the invention and will now be described with reference to FIGS. 2 to 5.

These securing means are formed here by two lateral front fittings 42, a rear fitting 44, and a central front fitting 43.

Figure 3:
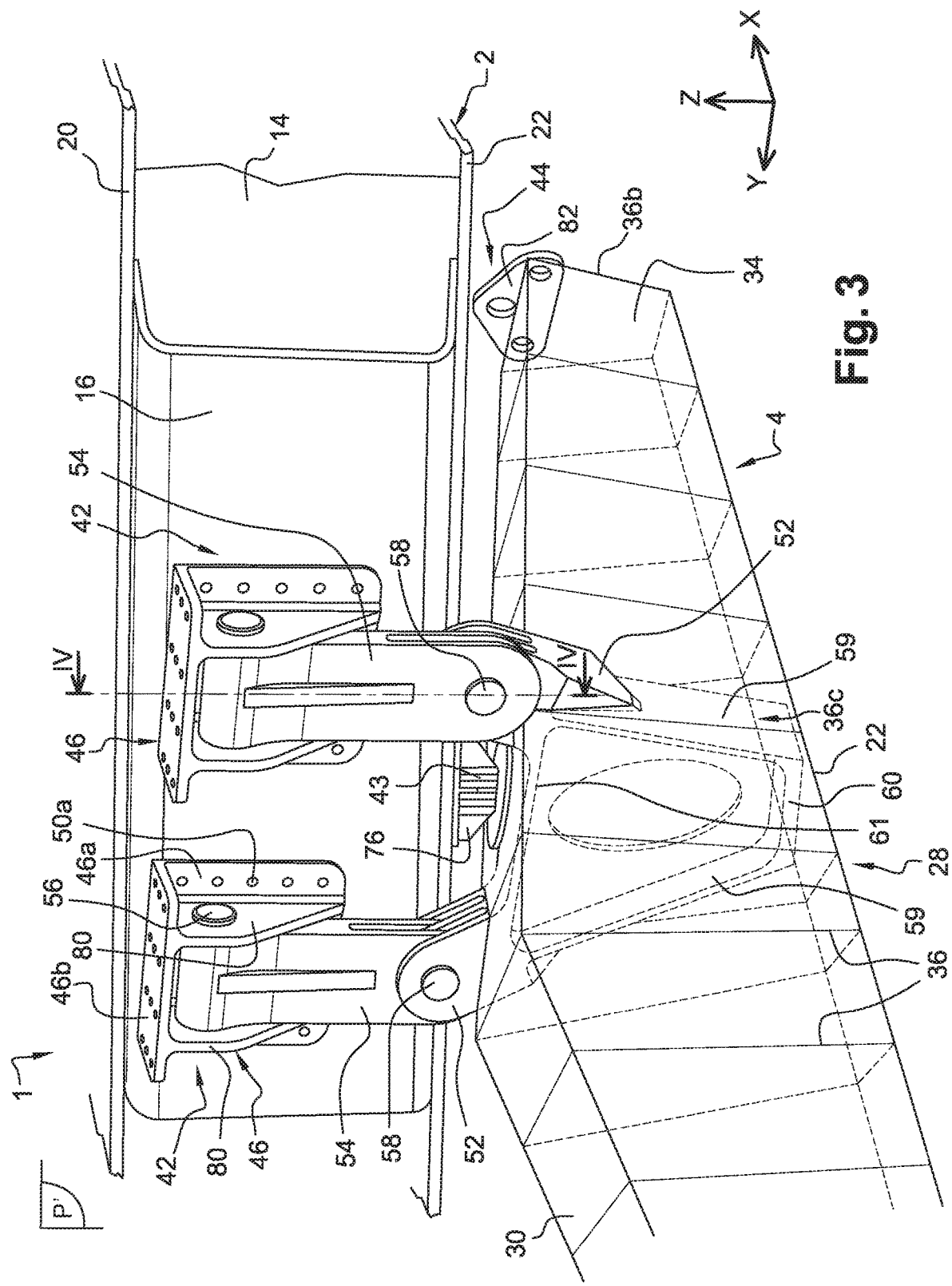
FIG. 3 is a perspective view of a part of the assembly shown in FIG. 2.
Figure 4:
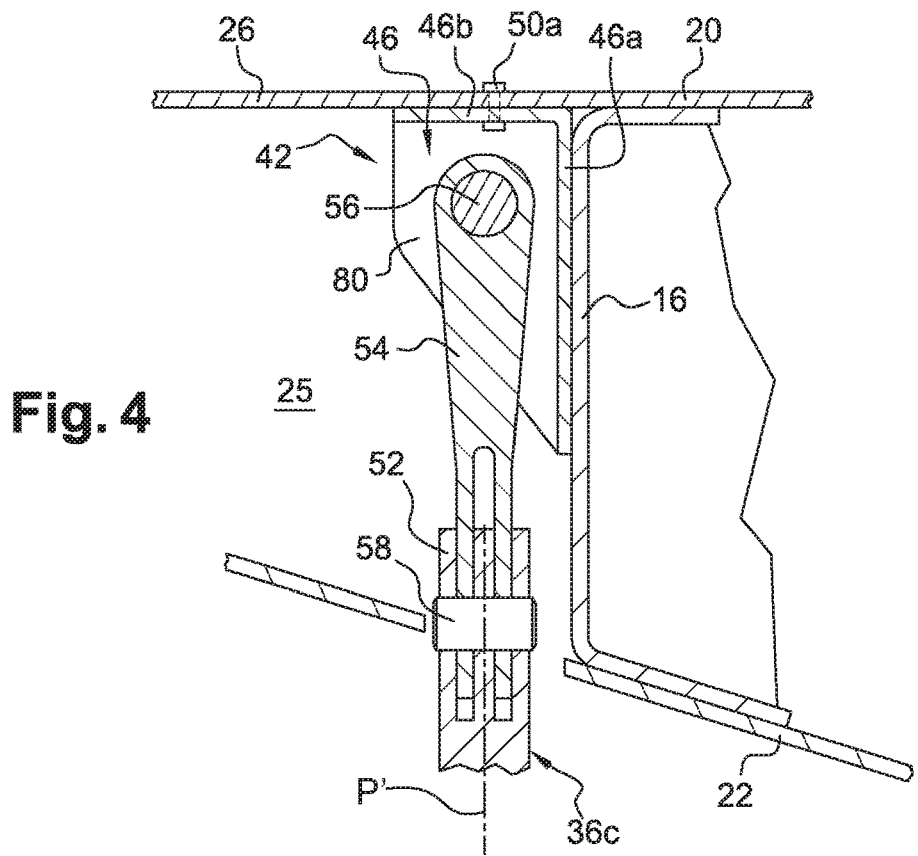
FIG. 4 is a cross-sectional view of the assembly shown in FIG. 3 along the section line IV-IV.

The two lateral front fittings 42 have an identical or similar design and are arranged substantially symmetrically to the abovementioned plane P', inclined with respect to the median plane XZ of the assembly 1, the latter plane being referenced "P" in FIG. 3. As a result, only one of the two lateral front fittings 42 will now be described.

The lateral front fitting 42, designed to react load in the direction Z, firstly has a first connecting portion 46. The latter is preferably formed by a connector in the form of a bracket comprising a first sole 46a secured and pressed against the front wing spar 16, and a second sole 46b secured and pressed against the suction-side skin 20. The first sole 46a is preferably substantially parallel to the plane P'. Securing is carried out with the aid of securing means 50a corresponding to conventional means of the bolt, rivet or similar element type.

The connector 46 is made in one piece and arranged entirely in the leading edge region 25. It also has two lateral flanks 80 arranged substantially orthogonally to the front spar 16. These flanks 80 act as a reinforcing rib at the angle between the two soles 46a, 46b and also as a stop, as will be described in detail below.

The connector 46 extends over a significant height of the front spar 16, or even over the entirety thereof in order to reduce the load at each of the securing elements 50a.

The lateral front fitting 42 also comprises a second connecting portion 52 that is an integral part of the rib 36c made in one piece. This second connecting portion 52 takes the form of a lug, or of several lugs that are stacked and/or spaced apart so as to ensure a safety function in the event of failure, this function commonly being known as a failsafe. In the embodiment depicted, there are three lugs 52, which are spaced apart from one another. Each lug 52 protrudes from the pylon box 28 laterally and upwardly, such that an end portion of the lug is accommodated in the leading edge region 25.

In order to link the two portions 46, 52, the lateral front fitting 42 comprises at least one securing member in the form of a shackle 54. Here, only one shackle 54 is provided with a double bottom end so as to ensure the failsafe function.

The shackle 54 extends substantially parallel to the direction Z. It has a top end articulated to a lug of the connector 46 with the aid of a first pin system 56 which has the particular feature of being oriented substantially parallel to the front spar 16. This makes it possible to move the first pin system 56 as close as possible to the front wing spar. The connector 56, the lateral flanks 80 of which bear the first pin system 56, can be more compact in the direction X as a result.

Moreover, the reduction in thickness of the connector 46 makes it possible to reduce the offset of load introduction into the front spar 16. This helps to make it possible to reduce the thickness of this connector even further, since the latter no longer requires specific dimensioning in order to withstand the cantilever effects, as they are known, that are likely to introduce a bending moment into the connector and into the front wing spar 16.

These measures are intended to align all of the elements of which the front fittings 42 are made in successive planes substantially parallel to the plane P'. They ensure a compact design in the direction X, making it possible to provide a large volume in front of the lateral front fittings 42, in the leading edge region 25, for the installation of systems and equipment 72, one of which is shown schematically in FIG. 2. These may be, for example, deicing elements, fuel ducts, hydraulic control lines, or leading edge moving flap actuation members.

Finally, it is noted that on account of the installation of the lateral front fittings 42 in the leading edge region 25, the overall size of the assembly 1 is reduced in the direction Z. This allows this assembly 1 to define a pylon box 28 that is sufficiently tall in the direction Z in order to support large-diameter engines, while maintaining a satisfactory ground clearance.

Moreover, the bottom end of the shackle 54 is articulated to the lugs 52 with the aid of a second pin system 58 oriented substantially orthogonally to the plane P' of the front spar 16. Consequently, this second pin system 58 is inclined at 90° to the first pin system 56.

As is apparent from the above, the lugs 52 of the two lateral front fittings 42 are made in a single piece formed by the interior rib 36c. The latter has a lower sole 60 secured to the lower spar 32 of the pylon box, and two opposite lateral soles 59 that are secured to the two opposite lateral panels 34, respectively. The lugs 52 are situated in the continuation of the opposite lateral soles 59. Finally, the rib 36c comprises an upper sole 61 secured to the upper spar 30, inside the pylon box 28. The two lateral fittings 42 thus cooperate closely by virtue of the interior rib 36c that they share, so as to allow the loads associated with the torque exerted about the direction X to be successfully reacted.

Alternatively, the lugs 52 could be made independently of the rib 36c and be attached to the outside of the pylon box 28, at the upper edge corners of this box. In this scenario, the lugs 52 are likewise situated respectively in the continuation of and in alignment with the two opposite lateral soles 59 of the rib 36c, which is situated inside the pylon box 28 like the other ribs 36.

Figure 5:
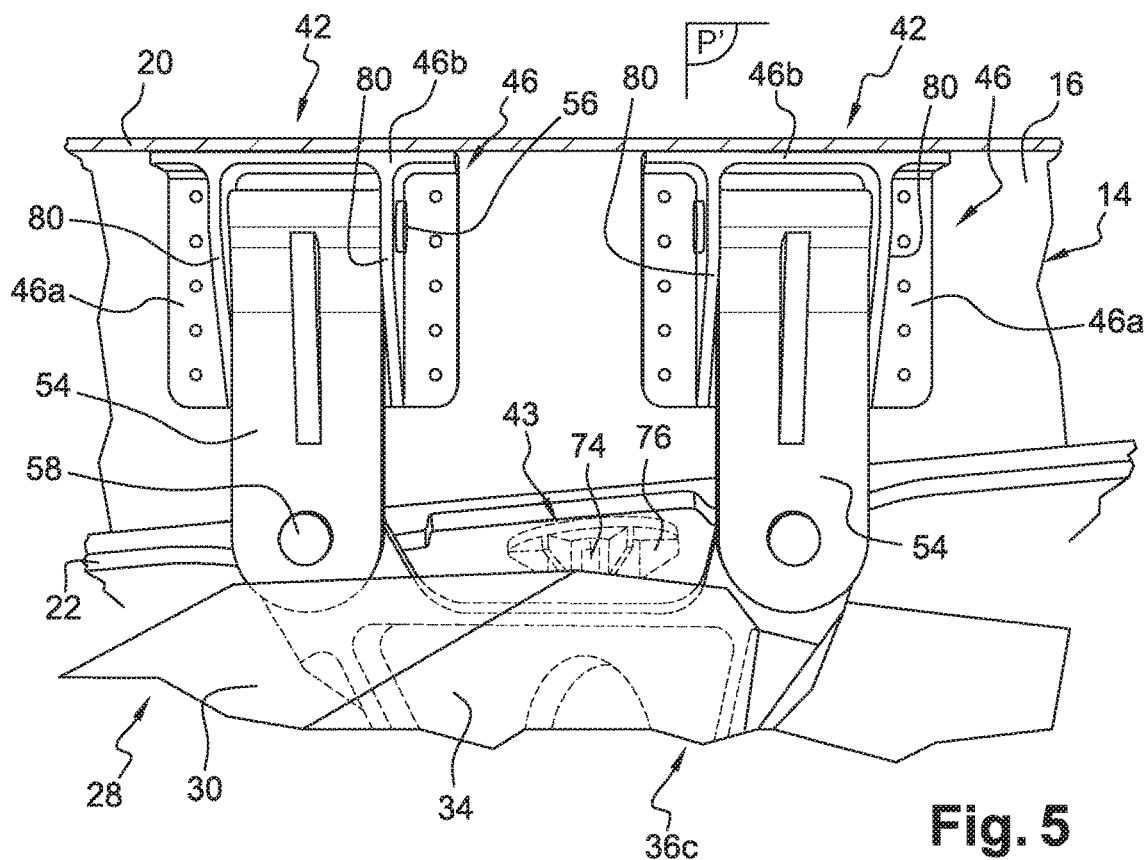
FIG. 5 is a view of the assembly shown in the preceding figures in a direction orthogonal to the single wing connector.

The central front fitting 43 comprises a shear pin 74 depicted in FIG. 5, this pin being oriented in the direction Z and secured to a connector attached to the pylon box, in line with the rib 36c. The pin 74 cooperates with a connector 76 attached under the pressure-side skin 22.

The central front fitting 43, which is preferably arranged in one and the same transverse plane as the two lateral front fittings 42, is designed to react shear load, as it is known, that is exerted in the directions Y and X. This reacting occurs close to or in a plane defined by the lower pressure-side skin. In the event of failure of this fitting 43, the loads in the direction Y can be reacted by the two lateral front fittings 42, by virtue of the shackles 54 and the connectors 42. Specifically, the top end of each shackle 54 is mounted in a sliding manner on its pin system 56 and arranged between the two lateral flanks 80 of the connector 46 bearing this system. Only a small clearance is maintained in the wingspan direction between the shackle 54 and each of its two associated flanks 80. Consequently, in the event of failure of the central front fitting 43, the flanks 80 are configured to be able to prevent the shackle 54 from moving in translation in the wingspan direction. This prevention of movement in translation thus makes it possible to ensure the failsafe function as regards the reacting of load in the direction Y.

Finally, the rear fitting 44 has a conventional design, being provided with a triangular shackle 82 that cooperates with the rear closing rib 36b of the pylon box 28. It is designed to react load in the directions Y and Z, thereby allowing the fittings 42, 43, 44 to form a statically determinate or almost statically determinate load-reacting system.

Of course, various modifications can be made by a person skilled in the art to the invention which has just been described only by way of nonlimiting examples and the scope of which is defined by the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft comprising:
   an aircraft wing comprising a wing box formed, in part, by a front wing spar, an upper suction-side skin and a lower pressure-side skin;
   an engine attachment pylon arranged under the wing, the pylon comprising a primary structure comprising a pylon box having an upper spar extending at least in part under the wing box, and
   a securing means comprising two lateral front fittings configured to secure the primary structure of the attachment pylon to the wing box, each of these fittings comprising:
      a first connecting portion secured to the front wing spar;
      a second connecting portion secured to the primary structure of the attachment pylon;
      at least one securing member linking the first and second connecting portions, said at least one securing member being articulated to the first connecting portion via a first pin system oriented substantially parallel to the front wing spar,
   wherein the two lateral front fittings are formed from elements all of which are made in successive planes substantially parallel to a plane P, the plane P comprising a front face of the spar.

2. The assembly as claimed in claim 1, wherein said at least one securing member is articulated to the second connecting portion via a second pin system oriented substantially orthogonally to the front wing spar.

3. The assembly as claimed in claim 1, wherein each securing member is arranged substantially parallel to a vertical direction of the assembly.

4. The assembly as claimed in claim 1, wherein each first connecting portion is a connector comprising a bracket secured both to the front wing spar and to the upper suction-side skin, said bracket being arranged entirely in a leading edge region of the wing.

5. The assembly as claimed in claim 1, wherein the two second connecting portions are made in one piece in an interior transverse reinforcing rib of the pylon box, the two second connecting portions projecting out of the pylon box and penetrating at least in part into a leading edge region of the wing.

6. The assembly as claimed in claim 1, wherein said securing means also comprise a central front fitting configured to react load exerted in a transverse direction of the assembly and in a longitudinal direction.

7. The assembly as claimed in claim 6, wherein each first connecting portion comprises two lateral flanks which bear said first pin system and between which said at least one associated securing member is arranged, said lateral flanks being configured to prevent said at least one securing member from moving in translation in a direction of the first pin system upon a failure occurring at said central front fitting.

8. The assembly as claimed in claim 6, wherein said central front fitting comprises a shear pin.

9. The assembly as claimed in claim 1, which comprises at least one system arranged in a leading edge region of the wing, in front of the lateral front fittings.

10. The assembly as claimed in claim 1, which comprises at least one piece of equipment arranged in a leading edge region of the wing, in front of the lateral front fittings.

11. The assembly as claimed in claim 1, wherein each of the lateral front fittings is configured to allow load exerted in a vertical direction of the assembly to be reacted.

12. The assembly as claimed in claim 1, wherein said securing means also comprise a rear fitting secured to a rear closing rib of the pylon box, and wherein the rear fitting is configured to allow load exerted in a vertical direction of the assembly and in a transverse direction of the assembly to be reacted.

13. The assembly as claimed in claim 1, wherein said securing means form a statically determinate load-reacting system.

14. An aircraft comprising at least one assembly as claimed in claim 1.

15. An assembly for an aircraft comprising:
an aircraft wing comprising a wing box formed, in part, by a front wing spar, an upper suction-side skin and a lower pressure-side skin;
an engine attachment pylon arranged under the wing, the pylon comprising a primary structure comprising a pylon box having an upper spar extending at least in part under the wing box, and
a securing means comprising two lateral front fittings configured to secure the primary structure of the attachment pylon to the wing box, each of these fittings comprising:
  a first connecting portion secured to the front wing spar;
  a second connecting portion secured to the primary structure of the attachment pylon;
  at least one securing member linking the first and second connecting portions, said at least one securing member being articulated to the first connecting portion via a first pin system oriented substantially parallel to the front wing spar,
wherein said at least one securing member is articulated to the second connecting portion via a second pin system oriented substantially orthogonally to the front wing spar.

16. An assembly for an aircraft comprising:
an aircraft wing comprising a wing box formed, in part, by a front wing spar, an upper suction-side skin and a lower pressure-side skin;
an engine attachment pylon arranged under the wing, the pylon comprising a primary structure comprising a pylon box having an upper spar extending at least in part under the wing box, and
a securing means comprising two lateral front fittings configured to secure the primary structure of the attachment pylon to the wing box, each of these fittings comprising:
  a first connecting portion secured to the front wing spar;
  a second connecting portion secured to the primary structure of the attachment pylon;
  at least one securing member linking the first and second connecting portions, said at least one securing member being articulated to the first connecting portion via a first pin system oriented substantially parallel to the front wing spar,
wherein the two second connecting portions are made in one piece in an interior transverse reinforcing rib of the pylon box, the two second connecting portions projecting out of the pylon box and penetrating at least in part into a leading edge region of the wing.

* * * * *